United States Patent
Quin et al.

(10) Patent No.: US 10,599,420 B2
(45) Date of Patent: *Mar. 24, 2020

(54) UPDATING A CONTROLLER UNIT IN A VEHICLE

(71) Applicant: 2236008 Ontario Inc., Waterloo (CA)

(72) Inventors: Spencer Leavitt George Quin, Kitchener (CA); Christopher Scott Travers, Ottawa (CA); Paul Streatch, Richmond (CA); Roger Francis Maclean, Ottawa (CA)

(73) Assignee: 2236008 ONTARIO INC., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,918

(22) Filed: Oct. 29, 2018

(65) Prior Publication Data

US 2019/0138292 A1 May 9, 2019

Related U.S. Application Data

(63) Continuation of application No. 15/429,379, filed on Feb. 10, 2017, now Pat. No. 10,114,634, which is a continuation of application No. PCT/CA2016/050748, filed on Jun. 27, 2016.

(60) Provisional application No. 62/286,047, filed on Jan. 22, 2016.

(51) Int. Cl.
*G06F 8/65* (2018.01)
*H04L 29/08* (2006.01)
*H04L 29/06* (2006.01)
*H04W 4/44* (2018.01)
*B60R 16/02* (2006.01)

(52) U.S. Cl.
CPC ............... *G06F 8/65* (2013.01); *B60R 16/02* (2013.01); *H04L 63/123* (2013.01); *H04L 67/12* (2013.01); *H04L 67/34* (2013.01); *H04W 4/44* (2018.02)

(58) Field of Classification Search
CPC ....... H04L 67/12; H04L 67/34; H04L 63/123; G06F 8/65; G06F 8/61; B60R 16/02; H04W 4/44
USPC .................................................. 717/168–178
See application file for complete search history.

(56) References Cited

U.S. PATENT DOCUMENTS

| | | | |
|---|---|---|---|
| 4,015,804 A | 4/1977 | Dobler | |
| 5,442,553 A | 8/1995 | Parrillo | |
| 8,949,823 B2 | 2/2015 | Ricci | |
| 9,715,378 B2 | 7/2017 | Dickerson | |
| 9,720,680 B2 | 8/2017 | Diedrich | |
| 9,841,970 B2 | 12/2017 | Vangelov | |
| 10,114,634 B2* | 10/2018 | Quin | G06F 8/65 |

(Continued)

OTHER PUBLICATIONS

Canadian Intellectual Property Office, International Search Report and Written Opinion for PCT/CA2016/050748 dated Sep. 12, 2016 (14 pages).

(Continued)

*Primary Examiner* — Marina Lee
(74) *Attorney, Agent, or Firm* — Trop, Pruner & Hu, P.C.

(57) ABSTRACT

In some examples, a service receives releases including machine-readable instructions from different vendors, the releases for respective controller units of a vehicle. The service communicates the releases wirelessly to the vehicle to update machine-readable instructions executing on the respective controller units of the vehicle.

20 Claims, 3 Drawing Sheets

(56) References Cited

U.S. PATENT DOCUMENTS

| | | |
|---|---|---|
| 2003/0163664 A1 | 8/2003 | Kanda |
| 2005/0187674 A1* | 8/2005 | Ando .................. G06F 8/61 |
| | | 701/1 |
| 2005/0256614 A1 | 11/2005 | Habermas |
| 2008/0005733 A1 | 1/2008 | Ramachandran |
| 2008/0295090 A1* | 11/2008 | Bestle .................. G06F 8/65 |
| | | 717/170 |
| 2009/0300595 A1 | 12/2009 | Moran |
| 2011/0307882 A1 | 12/2011 | Shiba |
| 2012/0167071 A1 | 6/2012 | Paek |
| 2013/0198737 A1 | 8/2013 | Ricci |
| 2013/0265178 A1 | 10/2013 | Tengler |
| 2014/0006555 A1 | 1/2014 | Shields |
| 2014/0325500 A1* | 10/2014 | Jang .................... G06F 8/65 |
| | | 717/173 |
| 2015/0006035 A1 | 1/2015 | Ricci |
| 2015/0113520 A1 | 4/2015 | Kotani |
| 2015/0169311 A1 | 6/2015 | Dickerson et al. |
| 2016/0070559 A1 | 3/2016 | West |
| 2016/0202966 A1 | 7/2016 | Vangelov |
| 2017/0212746 A1 | 7/2017 | Quin |
| 2019/0138292 A1* | 5/2019 | Quin .................... G06F 8/65 |

OTHER PUBLICATIONS

European Patent Office, Extended European Search Report for Appl. No. 16885473.5 dated Aug. 16, 2019 (8 pages).

\* cited by examiner

UPDATING A CONTROLLER UNIT IN A VEHICLE

CROSS REFERENCE TO RELATED APPLICATION

This application is a continuation of U.S. application Ser. No. 15/429,379, filed Feb. 10, 2017, U.S. Pat. No. 10,114,634, which is a continuation of International Appl. No. PCT/CA2016/050748, filed Jun. 27, 2016, which claims the benefit of U.S. Provisional Application No. 62/286,047, filed Jan. 22, 2016, which are all hereby incorporated by reference.

BACKGROUND

A vehicle such as a car or other type of vehicle can be used to carry people or goods from one location to another location. A vehicle can include a large number of separate parts, including mechanical parts as well as electronic control units (ECUs). The ECUs are used to control various different functions of a vehicle.

BRIEF DESCRIPTION OF THE DRAWINGS

Some implementations of the present disclosure are described with respect to the following figures.

DETAILED DESCRIPTION

Figure 1:
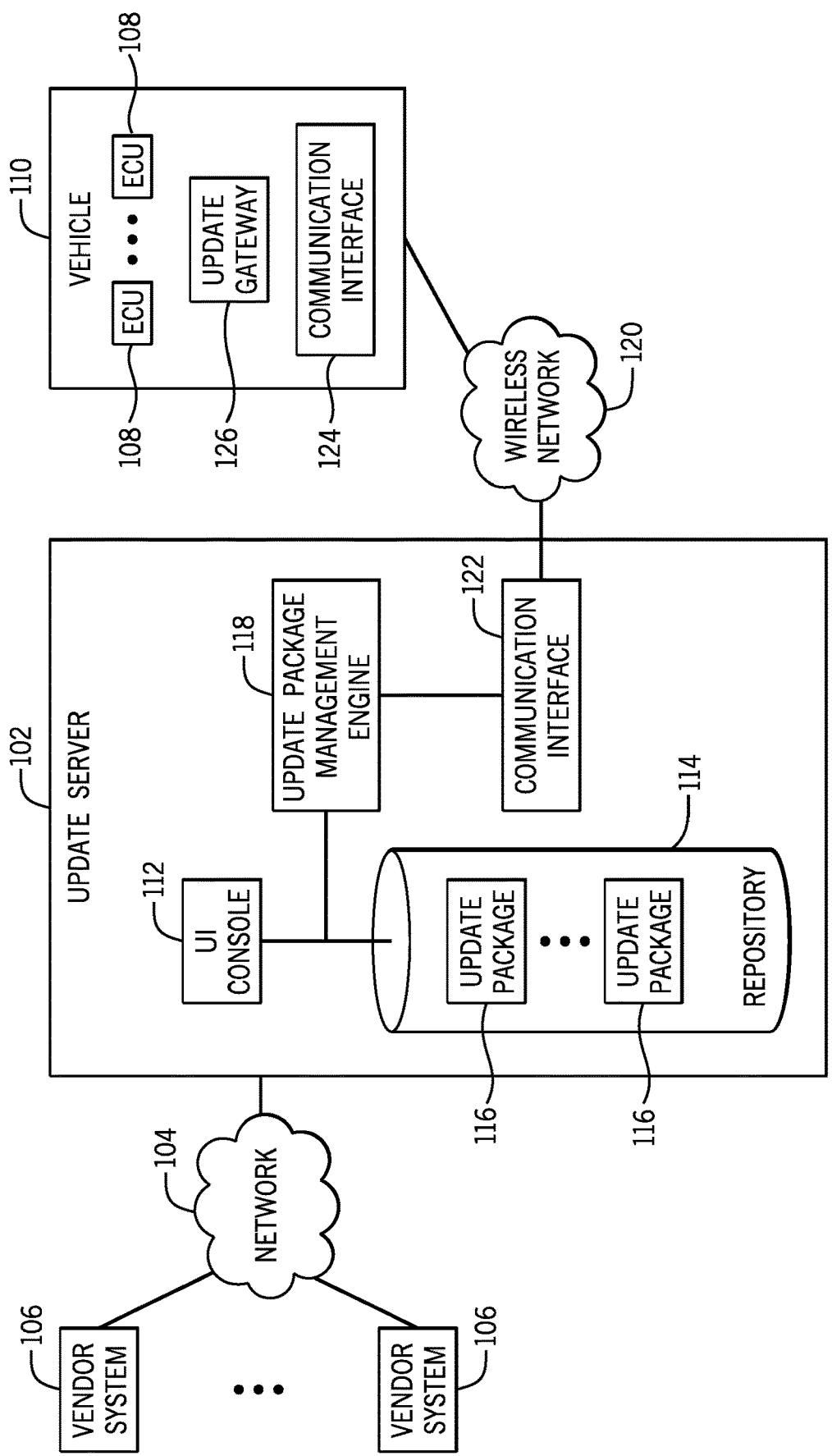
FIG. 1 is a schematic diagram of an example arrangement that includes an update server and a vehicle, according to some implementations.

A vehicle can refer generally to any machine that is used to carry people, goods and/or other general payload from one physical location to another physical location. Examples of vehicles include cars, trains, airplanes, boats, ships, submarines, and so forth. A vehicle can also refer to a drone, which is an un-manned vehicle that can be used to perform various different actions. A vehicle can include wheels to move between different physical locations. Alternatively, a vehicle can include structures to allow the vehicle to fly through the air, or to travel on or through water.

In addition to a large number of mechanical parts, a vehicle can also include electronic control units (ECUs). In the present disclosure, ECUs can also be referred to as "controller units." An ECU can refer to any embedded computing system that is part of the vehicle to control one or more subsystems in the vehicle. An ECU can be implemented with a processor, or with multiple processors. Examples of subsystems that can be controlled by ECUs include an engine of a vehicle, a brake subsystem of the vehicle, an air-conditioning system of the vehicle, a navigation system of the vehicle, and so forth.

An ECU can also execute software or other machine-readable instructions on the processor(s) of the ECU. As the ECUs of vehicles become more sophisticated, the software or other machine-readable instructions that execute in the ECUs also become more complex and sophisticated.

In some cases, it may be desirable to update the machine-readable instructions of the ECUs in the vehicle, such as to fix a bug of the machine-readable instructions, to add features, or for some other reason. This update process can be rather complicated, since multiple ECUs in a vehicle may be provided by corresponding different vendors, such that updates to machine-readable instructions of the ECUs would be provided by the multiple different vendors. A vendor can refer to an enterprise that makes or sells ECUs or machine-readable instructions for the ECUs. An enterprise can refer to a business concern, a government agency, an educational organization, or a human individual.

Having to physically plug a vehicle over a wired connection to an update server to perform updates of machine-readable instructions of ECUs in a vehicle can be inconvenient, since a user of the vehicle would have to bring the vehicle into a repair shop or other facility to allow for updates of the ECUs.

In accordance with some implementations of the present disclosure, techniques or mechanisms are provided to allow for machine-readable instructions of ECUs provided by multiple different vendors to be conveniently downloaded to vehicles using wireless communications, such as over a cellular network, a WI-FI network, or other type of wireless network. In this manner, the machine-readable instructions of ECUs of a vehicle can be updated as long as the vehicle is wirelessly connected over a specified wireless network (or any of various different wireless networks). For example, the updates can be performed while the vehicle is in operation, or alternatively, while the vehicle is idle or turned off.

Additionally, in accordance with some implementations of the present disclosure, multiple vehicles can be updated together using a common update package, or a set of update packages, to increase the efficiency of the update process.

FIG. 1 is a block diagram of an example arrangement that includes an update server 102 (e.g. an update service or a combination of an update service and a computer platform on which the update service is executable) that can be coupled over a network 104 to various vendor systems 106, where the vendor systems are associated with respective different vendors of ECUs 108 that can be included in a vehicle 110. Although just one vehicle 110 is shown in FIG. 1, it is noted that multiple vehicles can be in communication with the update server 102 in other examples. As described herein, the update server 102 may also be configured as a service, and alternatively as a service comprising one or more endpoints that provide an abstracted communication method for providing the update services. The update server 102 may also be configured as various services to provide the update functionality, where these services may be abstracted to networked based services (e.g. web services). As discussed herein, update server 102 or the related actions/services are not dependent on a single machine, and may be hosted in multi-machine, multi-tier systems, as well as cloud-based systems.

The network 104 between the vendor systems 106 and the update server 102 can be a wired network or a wireless network, or a combination of a wired network and a wireless network. A vendor system can refer to a computer or an arrangement of computers that is (are) used by a vendor of an ECU, or a vendor of machine-readable instructions of an ECU, to upload new versions of the machine-readable instructions to the update server 102.

The update server 102 can include a computer or an arrangement of computers. If implemented with multiple computers, the multiple computers of the update server 102 can be geographically distributed across different geographical locations, in some examples.

The update server 102 includes a user interface (UI) console 112 that is accessible by a vendor system 106 to interact with the update server 102, such as for the purpose of uploading an update package from a vendor system 106 to the update server 102, or to build an update package at the update server 102. Generally, the UI console 112 can be presented to allow for vendors to provide update packages 116 to the update server 102.

The UI console 112 can present a user interface, such as in the form of a web page or other type of user interface, that can be viewed at a vendor system 106, a service center, and/or a diagnostic tool.

In other implementations, instead of using the UI console 112 to upload or build update packages, an automated mechanism can be used instead where the update server 102 can interact with the vendor systems 106 to receive or build update packages.

As shown in FIG. 1, the update server 102 includes a repository 114 to store update packages 116 that can be provided by various different vendors. In other examples, instead of storing update packages 116 in one repository 114, update packages 116 can be stored in multiple repositories, which can be external of the update server 102. The update server 102 can be notified in response to new update packages added to such repositories.

An "update package" can refer generally to machine-readable instructions and associated information (e.g. metadata) that can be used to perform an update of machine-readable instructions that execute on respective ECUs 108 in the vehicle 110. The machine-readable instructions that execute within a given ECU 108 in the vehicle 110 can be according to a particular version, while an update package 116 to update the machine-readable instructions of the given ECU 108 can be according to a newer version. Multiple update packages can make up a release that is provided by a vendor to update one or more ECUs.

In some examples, metadata can be associated with each update package 116, to describe the content of the update package 116, such as metadata identifying the ECU(s) that the update package 116 is to update, metadata identifying a version of the machine-readable instructions, order of installation, security information, and so forth. In some examples, each ECU 108 of the vehicle 110 can be assigned a unique identifier, which does not change until the ECU 108 is replaced or changed.

The update server 102 includes an update management engine 118 that can manage the storing of the update packages 116 as well as the delivery of update packages 116 to the vehicle 110 over a wireless network 120. In addition, the update management engine 118 can be used to perform other tasks, such as to collect profiles of vehicles and to perform grouping of the vehicles that share at least one property (e.g. vehicle model, vehicle options, etc.) such that an update package can be downloaded to this group of vehicles, rather than to an individual vehicle.

The update management engine 118 can be implemented as machine-readable instructions or as a combination of machine-readable instructions and hardware processing circuitry in the update server 102. The hardware processing circuitry can include a microprocessor, a core of a multi-core microprocessor, a microcontroller, a programmable integrated circuit, a programmable gate array, or other hardware processing circuitry.

The update server 102 further includes a communication interface 122 to allow the update server 102 to communicate over the wireless network 120 with the vehicle 110 (or with multiple vehicles). The wireless network 120 can be a cellular network, a WI-FI network, or other type of wireless network.

The vehicle 110 also includes a communication interface 124 to communicate over the wireless network 120. In addition, the vehicle 110 includes an update gateway 126 that can control the updating of machine-readable instructions of the ECUs 108 based on update packages 116 downloaded from the update server 102 to the vehicle 110 over the wireless network 120. The update gateway 126 can include machine-readable instructions or a combination of machine-readable instructions and hardware processing circuitry of the vehicle 110.

In some examples, a release can be activated to authorize update packages 116 that are part of the release to be delivered to the vehicle 110 (or vehicles). The update management engine 118 can decide how and when update packages 116 are delivered to the vehicle 110 (or vehicles). For example, the update management engine 118 can decide that vehicles of a particular make and model and having a specific combination of optional equipment can be upgraded first (as part of a group, for example), followed by other vehicles.

Update Server Operation

Figure 2:
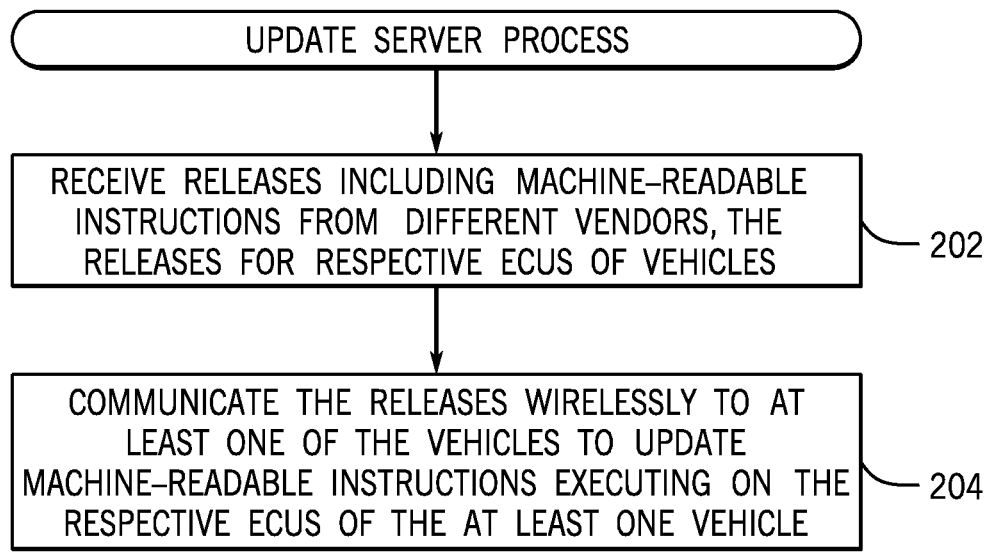
FIG. 2 is a flow diagram of an example process of an update server according to some implementations.

FIG. 2 is a flow diagram of an example process that can be performed by the update server 102 (or more specifically, by the update management engine 118), in some examples. The update server 102 receives (at 202) releases including machine-readable instructions from different vendors, where the releases are for respective ECUs of vehicles. As noted above, each release from a respective vendor can include multiple update packages 116 shown in FIG. 1.

In addition, the update server communicates (at 204) the releases wirelessly to at least one vehicle to update machine-readable instructions executing on the respective ECUs of the at least one vehicle.

In further implementations, the update management engine 118 can collect a profile of a vehicle, where the profile includes information relating to components of the vehicle. The profile can include information relating to the ECUs and installed releases of machine-readable instructions executing on the ECUs. The profile can also include information relating to an identity of a wireless network, such as the wireless network 120, over which the vehicle 110 is communicating.

The update management engine 118 collects a profile of the vehicle 110, the profile including information relating to any of or all dependent components or independent components of the vehicle that are in communication with the update gateway 126 (or multiple update gateways) of the vehicle. The update management engine 118 may also collect information about the hierarchical network configuration of the vehicle and which, if any, additional gateways are to be used to communicate with each component. When multiple gateways are present, the update gateway 126 may be called the primary gateway 126, and additional gateways may be called secondary gateways. As described herein, the update packages, and the processes and methods used for updating, may be used within the hierarchical structure of the vehicle to update components on sub-networks using the secondary gateways.

In addition, the update management engine 118 can receive information regarding a status relating to the updating of machine-readable instructions on at least one ECU in the vehicle 110. The status that is indicated by the received information can be a success status (to indicate that the machine-readable instructions of at least one ECU has been successfully updated), a failure status (to indicate that the update of machine-readable instructions on an ECU has failed), a partial failure status (to indicate that the update of machine-readable instructions has partially failed), a rollback status (to indicate that an update of machine-readable instructions of an ECU has started, but for some reason the machine-readable instructions of the ECU has been rolled back to a prior version), and a retry status (to indicate that a previous attempt at performing an update of machine-readable instructions of an ECU has been made, and due to a failure, another update of the machine-readable instructions of the ECU is being retried). In further examples, the status can indicate the progress through an update lifecycle, such as "download started," "download complete," "install started," "install complete," "rebooting," and so forth.

The update management engine 118 can also indicate, in response to the received information regarding the status relating to the update of machine-readable instructions of an ECU in the vehicle 110), a problem associated with an update using a given update package. The indication regarding the status relating to the update can be presented to the UI console 112 of the update server 102, or alternatively, can be sent to a remote entity, such as a vendor system 106, or alternatively, to a user device (e.g. a computer, a smartphone, etc.) of a user of the vehicle 110.

The update management engine 118 can also determine, in response to the information regarding the status relating to the update of the machine-readable instructions of an ECU in the vehicle 110, a cause of a problem relating to an update using a given update package. The cause of the problem may be a communication error, corruption of an update package, and so forth. The update management engine 118 can also request further information from the vehicle 110 to determine the cause of the problem relating to the update of the given release.

There can be dependencies between ECUs 108 of the vehicle 110. A dependency exists between a first ECU and a second ECU if the operation of the first ECU depends upon the operation of the second ECU, or vice versa. In some implementations, a dependency check between the ECUs 108 of the vehicle 110 can be performed, and the results of this dependency check can be performed by a processor (or processors) of the vehicle 110 and can be output by the vehicle 110 for receipt by the update management engine 118 over the wireless network 120. The result of the dependency check can be useful for an analyst or the update server to determine whether there are any issues with respect to interactions between ECUs in the vehicle 110, either before or after updates of machine-readable instructions of the ECUs 108 have been performed.

The update packages 116 can be associated with metadata specifying a manner and time for downloading each update package to a vehicle. The metadata can specify that a download of the package is to a group of vehicles that share at least one property.

In some examples, an update package can be created at a back-office system of a respective vendor, where a "back-office system" can refer to a system associated with the vendor that is separate from the update server 102.

Vehicle Operation

Figure 3:
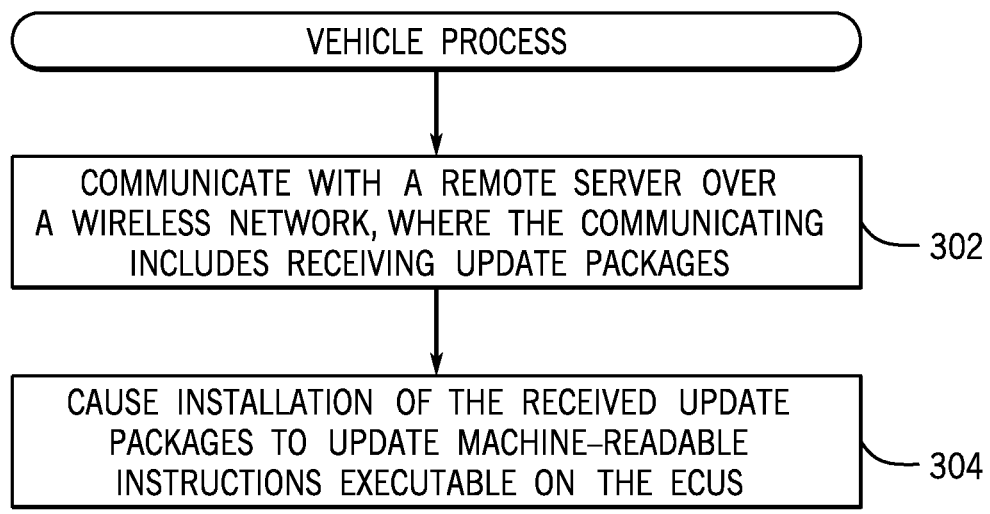
FIG. 3 is a flow diagram of an example process of a vehicle according to some implementations.

FIG. 3 is a flow diagram of an example process that can be performed by the vehicle 110, such as by the update gateway 126 of the vehicle 110. The update gateway 110 is able to communicate (at 302) with a remote server (e.g. the update server 102) over a wireless network (e.g. the wireless network 120), where the communicating includes receiving update packages containing updated releases of machine-readable instructions for the ECUs 108 of the vehicle 110.

The update gateway 126 causes (at 304) installation of the received update packages to update machine-readable instructions executable on the ECUs 108. The ECUs may be connected on various network systems, wired and/or wirelessly in the vehicle. For example, the gateway 126 may be connected to various bus types, such as Controller Area Network (CAN), FlexRay (FlexRay is an automotive network communications protocol developed by the FlexRay-Consortium), J1850 (a Society of Automotive Engineers (SAE) standard for a bus in a vehicle), J1939 (another SAE standard for a bus in a vehicle), Local Interconnect Network (LIN), Media Oriented Systems Transport (MOST), value-added network (VAN), etc. Thus, the gateway 126 may cause installation on ECUs connected to their respective communication pathway. Moreover, ECUs for update may be connected through another ECU on a network that is not directly attached to the gateway 126, the gateway 126 may cause the installation by way of a proxy ECU that has connectivity to the ECU for update.

Although just one update gateway 126 is shown in FIG. 3, it is noted that in further examples, multiple update gateways can be included in the vehicle 110. Each update gateway of the multiple update gateways can control the update of a respective different part of a given ECU (or set of ECUs).

In some examples, the update gateway 126 can install a given update package by directly installing the given package on a respective ECU 108. In alternative examples, the update gateway 126 is to install the given package by communicating the given package to a third party installer service (not shown) to install the given package on a respective ECU, where the third party installer service manages installation of packages of a collection of ECUs.

In further examples, the update gateway 126 includes machine-readable instructions, and the machine-readable instructions of the update gateway 126 can also be updated based on an update package received from the update server 102.

In further examples, the update gateway 126 can cause installation of content, configuration information, or calibration information to a non-ECU component, such as an infotainment system.

The update gateway 126 or installer service can collect a status or progress of installation of a given package, and to send a report including the status or progress to the update server 102.

The update gateway 126 or installer service is to check an integrity of each respective update package 116 by verifying a signature of the respective update package 116.

Communication of the update packages 116 within the vehicle 110 can be performed over a bus of the vehicle 110 to the ECUs. The communication of the update packages can be protected by a security protocol, such as by an encryption protocol in which the information of the update packages are encrypted prior to communication over the bus of the vehicle 110.

The update gateway 126 or the installer service is to cause installation of the packages for a subset of ECUs such that the packages for the subset are all installed or none are installed. Thus, within the subset of ECUs, either all updates are committed, or none are. This may be useful in cases where there are dependencies between ECUs such that one ECU should not be updated unless the other ECU(s) is (are) also updated.

Updates of the ECUs in the subset can be performed in multiple stages. Thus, within a first stage, the update process updates the ECUs of the subset in the first stage, and after the updates have committed in the first stage, the update process can proceed to the next stage of the multiple stages.

The update gateway 126 can store a current version of machine-readable instructions for a given ECU prior to updating the machine-readable instructions for the given ECU. The stored current version is usable to perform a rollback in response to failure of the updating of the machine-readable instructions for the given ECU.

Figure 4:
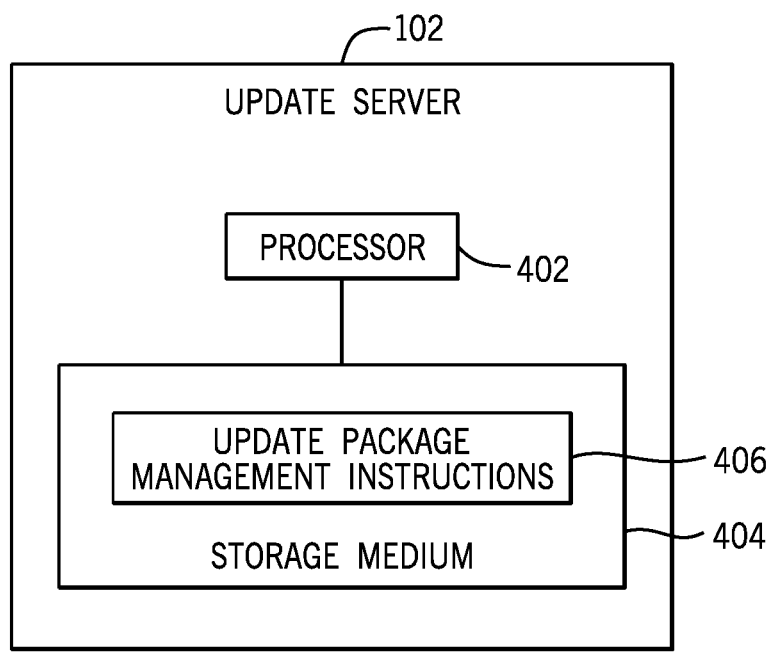
FIG. 4 is a block diagram of an example update server, according to some implementations.

FIG. 4 is a block diagram of an example arrangement of the update server 102, which includes a processor (or multiple processors) 402. A processor can include a microprocessor, a core of a multi-core processor, a microcontroller, a programmable integrated circuit, a programmable gate array, or other hardware processing circuitry. The update server 102 also includes update a non-transitory machine-readable or computer-readable storage medium 404 that stores package management instructions 406 that are executable on the processor(s) to perform tasks of the update package management engine 118 (FIG. 1) and/or other tasks of the update server 102 as described in this disclosure.

Figure 5:
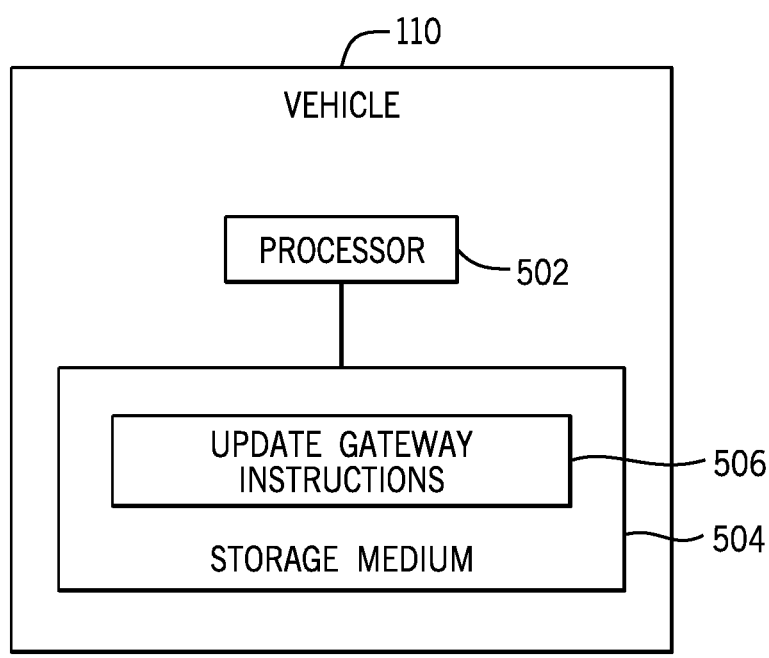
FIG. 5 is a block diagram of an example vehicle, according to some implementations.

FIG. 5 is a block diagram of an example vehicle 110, which includes a processor (or multiple processors) 502 and a non-transitory machine-readable or computer-readable storage medium 504 that stores update gateway instructions 506. The update gateway instructions 506 are executable on the processor(s) 502 to perform tasks of the update gateway 126 (FIG. 1) and/or other tasks of the vehicle 110 as described in this disclosure.

The storage medium 404 or 504 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by an update gateway in a vehicle over a wireless network, releases comprising machine-readable instructions from different vendors, the releases being for respective controller units of the vehicle, and the controller units being from the different vendors, wherein the releases are associated with metadata specifying a manner and time for downloading each release of the releases to the vehicle, and wherein the metadata specifies that a download of a release of the releases is to a group of vehicles that share at least one property; and
   installing, by the update gateway in the vehicle, the received releases in the vehicle to update machine-readable instructions executable on the respective controller units of the vehicle.

2. The method of claim 1, wherein the update gateway is connected to different types of networks or buses in the vehicle, and the controller units are connected to the different types of networks or buses.

3. The method of claim 1, wherein the releases are received by the update gateway from a service that presents a user interface (UI) console accessible by vendor systems associated with the different vendors to provide the releases to the service.

4. The method of claim 3, further comprising:
   sending, by the vehicle to the service, a profile of the vehicle, the profile including information relating to any of or all dependent components or independent components of the vehicle that are in communication with the update gateway of the vehicle.

5. The method of claim 4, wherein the profile includes information relating to the controller units and installed releases of the machine-readable instructions executable on the controller units.

6. The method of claim 4, wherein the profile includes information relating to an identity of the wireless network over which the vehicle is communicating.

7. The method of claim 4, further comprising:
   sending, by the vehicle to the service, information regarding a status relating to the update of the machine-readable instructions executable on the respective controller units of the vehicle, the status selected from among success, failure, partial failure, rollback, and retry.

8. The method of claim 1, wherein the update gateway directly installs a first release of the releases onto a first controller unit of the controller units.

9. The method of claim 1, wherein the update gateway indirectly installs a first release of the releases onto a first controller unit of the controller units by communicating the first release to an installer service to install the first release onto the first controller unit.

10. The method of claim 1, further comprising:
    receiving an update of machine-readable instructions of the update gateway; and
    installing the update onto the update gateway to update the machine-readable instructions of the update gateway.

11. The method of claim 1, further comprising:
    verifying, by the update gateway, an integrity of each respective release of the releases by verifying a signature of the respective release.

12. A vehicle comprising:
    a plurality of controller units from different vendors to perform respective tasks in the vehicle; and
    an update gateway to:
    receive, over a wireless network, update packages comprising machine-readable instructions from the different vendors, the update packages being for respective controller units of the plurality of controller units from the different vendors, wherein the update packages are received by the update gateway from a service that presents a user interface (UI) console accessible by vendor systems associated with the different vendors to provide the update packages to the service; and cause installation of the received update packages to update machine-readable instructions executable on the plurality of controller units.

13. The vehicle of claim 12, wherein the update gateway is to install a given update package of the update packages by one or both of:

communicating the given update package to a third party installer service to install the given update package on a respective controller unit of the plurality of controller units, wherein the third party installer service manages installation of update packages of a collection of the plurality of the controller units, and directly installing the given update package of the update packages on the respective controller unit.

14. The vehicle of claim 12, wherein the update gateway is connected to different types of networks or buses in the vehicle, and the plurality of controller units are connected to the different types of networks or buses.

15. The vehicle of claim 12, wherein the update gateway is to:

send, to the service, a profile of the vehicle, the profile including information relating to any of or all dependent components or independent components of the vehicle that are in communication with the update gateway of the vehicle.

16. The vehicle of claim 15, wherein the profile includes an identity of the wireless network over which the vehicle is communicating.

17. The vehicle of claim 12, wherein the update packages comprise metadata specifying a manner and time for downloading each update package of the update packages to the vehicle, and specifying that a download of an update package of the update packages is to a group of vehicles that share at least one property.

18. A non-transitory machine-readable storage medium comprising instructions that upon execution cause an update gateway of a vehicle to:

send, over a wireless network to a service, a profile of the vehicle, the profile including an identity of the wireless network over which the vehicle is communicating;

receive, over the wireless network from the service, update packages comprising machine-readable instructions from different vendors of respective controller units in the vehicle, the update packages being for the respective controller units from the different vendors; and cause installation of the received update packages to update machine-readable instructions executable on the respective controller units.

19. The non-transitory machine-readable storage medium of claim 18, wherein the update gateway is connected to different types of networks or buses in the vehicle, and the controller units are connected to the different types of networks or buses.

20. The non-transitory machine-readable storage medium of claim 18, wherein the update packages comprise metadata specifying a manner and time for downloading each update package of the update packages to the vehicle, and specifying that a download of an update package of the update packages is to a group of vehicles that share at least one property.

* * * * *